Feb. 8, 1966 SHINTARO OSHIMA ETAL 3,234,526

ANALOGUE MEMORY CIRCUIT

Filed Sept. 27, 1960 4 Sheets-Sheet 1

Feb. 8, 1966 SHINTARO OSHIMA ETAL 3,234,526

ANALOGUE MEMORY CIRCUIT

Filed Sept. 27, 1960 4 Sheets-Sheet 3

3,234,526
Patented Feb. 8, 1966

3,234,526

ANALOGUE MEMORY CIRCUIT

Shintaro Oshima, Musashino-shi, Hajime Enomoto, Ichikawa-shi, and Shiyoji Watanabe, Tokyo-to, Japan, assignors to Kokusai Denshin Denwa Kabushiki Kaisha, Tokyo-to, Japan, a company of Japan Filed Sept. 27, 1960, Ser. No. 58,660
Claims priority, application Japan, Sept. 28, 1959, 34/30,388
9 Claims. (Cl. 340—174)

The present invention relates to an analogue memory circuit.

Various kinds of the systems for shifting a digital signal have been proposed with the development of electronic computers and the like. The system for shifting analogue amount, has not yet been used in practice, because it is difficult to obtain a stable analogue memory circuit. Accordingly, hitherto, an analogue signal had to be shifted after it had been converted to a digital signal even when it was necessary to shift said analogue amount. On the other hand, with the development of the automatic control or communication technical division, it has been forcibly required to shift surely and stably the analogue amount itself or an amount which is proportional to the said analogue amount.

An object of the present invention is to provide new and improved circuits capable of carrying out a stable and precise shifting of any analogue amount by the use of an analogue memory system (refer to U.S. Patent 3,116,476) and a feed-back or loops.

The manner in which the foregoing as well as other objects and advantages may best be achieved will be understood more fully from consideration of the following description of the principle and embodiments of the present invention, taken in connection with the accompanying drawings, in which the same or equivalent members are designated by the same numerals and references, and in which:

FIG. 14 is a representative block diagram of analogue memory circuit according to this invention;

FIG. 15 is a block diagram of a modification of analogue memory circuit showing in FIG. 14.

Prior description of the present invention, writing-in and reading-out operations of an example of the analogue memory element to be used in the present invention will be described in connection with FIGS. 1 and 2, as follows.

Figure 1:
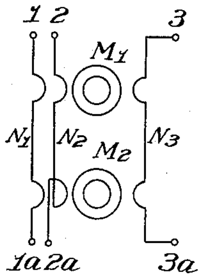
FIG. 1 is a schematic connection diagram of an analogue memory element to be used in the present invention.
Figure 2:
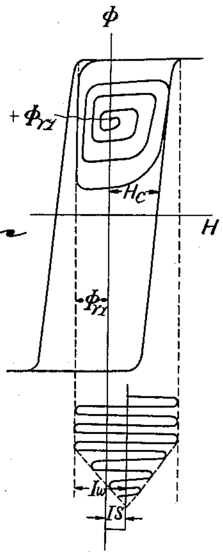
FIG. 2 shows hysterisis charactristic curves of a magnetic core to be used in the present invention.

Referring to FIG. 1, the analogue memory element comprises two magnetic cores $M_1$ and $M_2$, each having a hystereses characteristic curve as shown in FIG. 2; three coils wound on the said core $M_1$ so as to have the same polarity; two coils wound on the said core $M_2$ so as to have the same polarity and another coil wound around the said core $M_2$ so as to have reverse polarity to that of the former two coils; an input signal winding $N_1$ consisting of one coil wound on the core $M_1$ and one coil wound on the core $M_2$, said two coils having the same polarity and being connected in series to each other; an exciting winding $N_2$ consisting of one coil wound on the core $M_1$ and one coil wound on the core $M_2$, said coils having reverse polarity with respect to each other and being connected in series; and an output signal winding $N_3$ consisting of one coil of the core $M_1$ and one coil of the core $M_2$, said coils having the same polarity and being connected in series.

Figure 4:
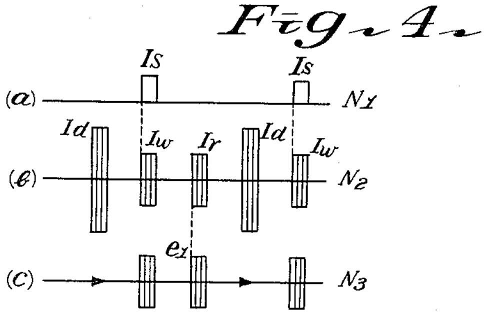
FIG. 4 shows schematic views for showing timing diagrams as to the various currents to be supplied to the windings $N_1$, $N_2$, and $N_3$ of the memory element of FIG. 1.

Operation of the circuit of FIG. 1 is as follows:

(1) An alternating current $I_d$ (such as shown in FIG. 4(*b*)) which is sufficiently large to erase the prior memorized signal is supplied to the terminals 2 and **2*a*** of the winding $N_2$, whereby the magnetic cores $M_1$ and $M_2$ are erased.

(2) A high frequency exciting current $I_w$, such as shown in FIG. 4(*b*), having a suitable amplitude for inducing a magnetic field which is equal to or larger than the coercive force $Hc$ of the core $M_1$ or $M_2$ is supplied to the winding $N_2$, and, at the same time, a pulse current $I_s$ which is a small analogue information input signal such as shown in FIG. 4(*a*) is supplied to the terminals 1 and **1*a*** of the winding $N_1$, as shown in the lower position of FIG. 2, whereby the alternating current magnetic field caused by the current $I_w$ and the direct current magnetic field $I_s$ are superimposed and the said analogue input information signal $I_s$ is damped to zero after the high-frequency-bias current $I_w$ is converged to zero, or both signals $I_s$ and $I_w$ are smoothly converged to zero, together. As the result of the above mentioned writing operation, the residual magnetism of the core $M_1$ and $M_2$ take the value proportional to the $I_s$, because of the same reason as the principle of high frequency writing bias method in the case of the writing operaiton of magnetic tape recorder.

(3) When the residual flux which is written as described above and is in proportion to the analogue information input signal pulse current $I_s$ is to be read out, a high frequency reading current $I_r$, such as shown in FIG. 4(*b*) having an amplitude which is not sufficient to erase the residual flux of the cores $M_1$ and $M_2$ is supplied and at the same time produces an appropriate hysteresis loop of the cores $M_1$ and $M_2$ thereby performing non-destructive sensing of the residual flux, is supplied to the winding $N_2$, whereby an even order higher harmonic frequency voltage $e_1$ having the phase (0 or $\pi$) corresponding to the polarity (determined by the polarity of the input signal current $I_s$) of the magnetic flux of the magnetic cores $M_1$ and $M_2$ and having an amplitude which is in proportion to this residual magnetic flux density $B_r$ which is in proportion to the current $I_s$ is read out from the output winding $N_3$, as shown in FIG. 4(*c*).

It is the reason that the even order high harmonic signals of the reading-out signal $I_r$ which is read out by means of the reading-out signal $I_r$ has the value being proportional to the equivalent even order coefficient of nonlinear magnetic susceptibility at the small portion around the residual magnetism in the magnetic hysteresis characteristic. Of course, the said value of the read-out even order high harmonic signal is also proportional to the analogue information signal.

Figures 3, 12, 13:
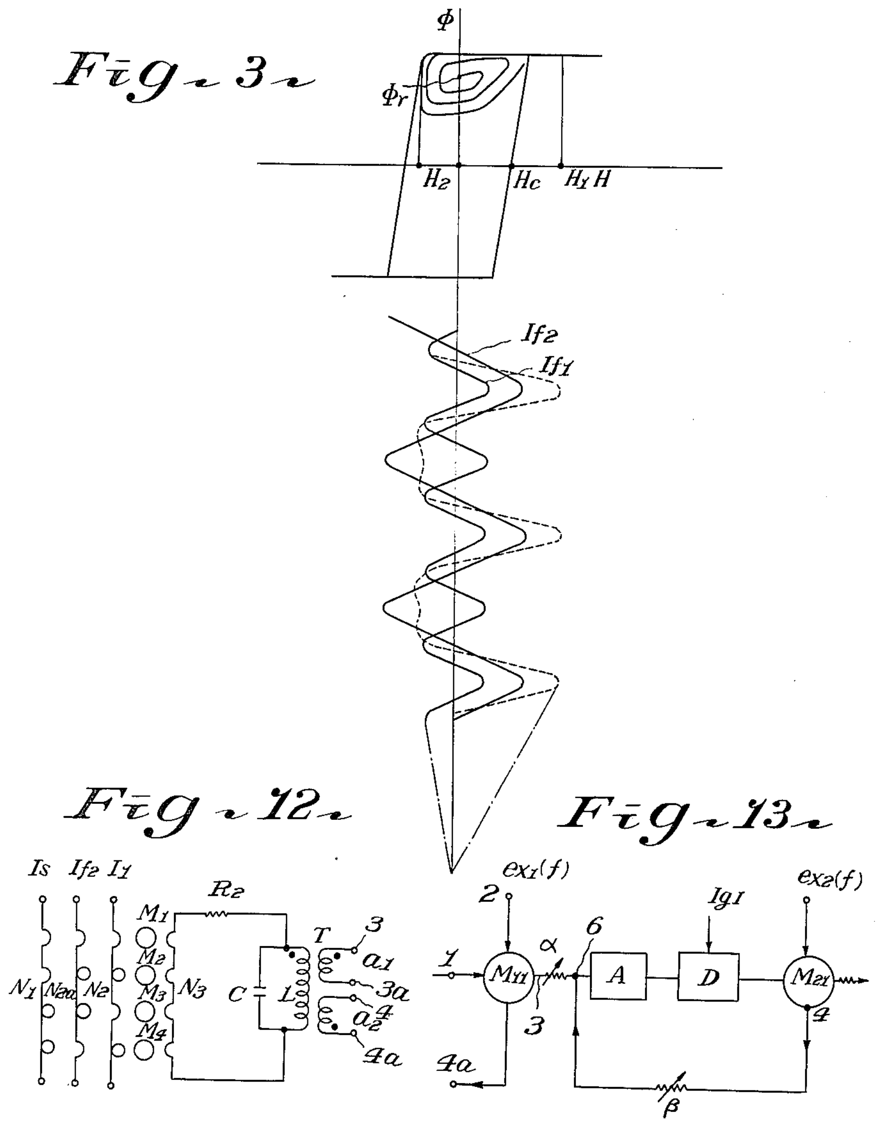
FIG. 3 shows hysterisis characteristic curves and wave forms for describing the principle of the memory element to be used in this invention.
FIGS. 9 and 12 are, respectively, connection diagrams of the other analogue memory elements to be used in this invention.
FIG. 13 is a block connection diagram of only an improved part of the embodiment of FIG. 11.

The above description relates to the case, wherein a direct current pulse signal is supplied as the information signal. However, as shown in FIG. 3, a high frequency signal $I_{f1}$ may be used in the place of the pulse signal as the information input signal. In this case, if the frequency $f_1$ of the signal $I_{f1}$ is selected to be equal to two times ($2_{f2}$) the frequency $f_2$ of the exciting high frequency current for writing-in and reading-out, and the phase relation between the frequencies $f_1$ and $f_2$ is suitably selected, both of the frequencies of the input signal and output signal can be made equal to $f_1$, and the residual magnetic flux $\phi_r$ having a phase corresponding to the phase (which corresponds to the polarity of the pulse signal) of the input signal and having a magnitude which is in proportion to the input signal can be produced to carry out writing of the input signal, and this written flux $\phi_r$ can be read out by impressing only the current $I_{f2}$.

The above-description relates to the case wherein the ferro-magnetic cores are used as the analogue memory elements, but the same operation as the above case can be obtained by using ferro-electric bodies in the place of ferro-magnetic cores and by using electric field in the place of magnetic field.

According to this invention, a very stable and precise circuit for memorizing any analogue amount can be obtained by combination of the above-mentioned memory element and a feed-back loop.

Figure 5:
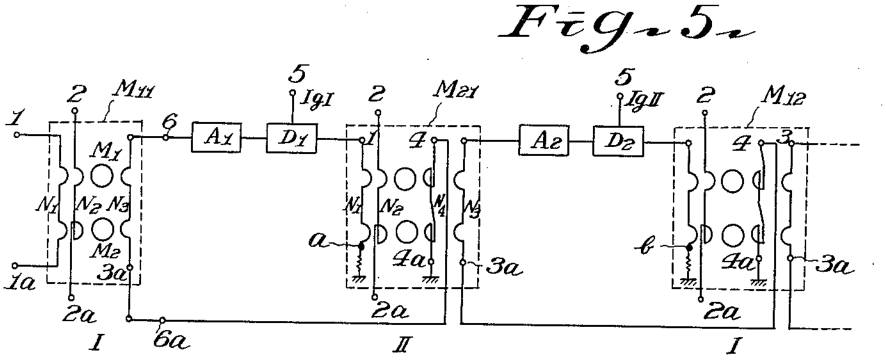
FIG. 5 is a connection diagram of one embodiment of this invention.
Figure 6:
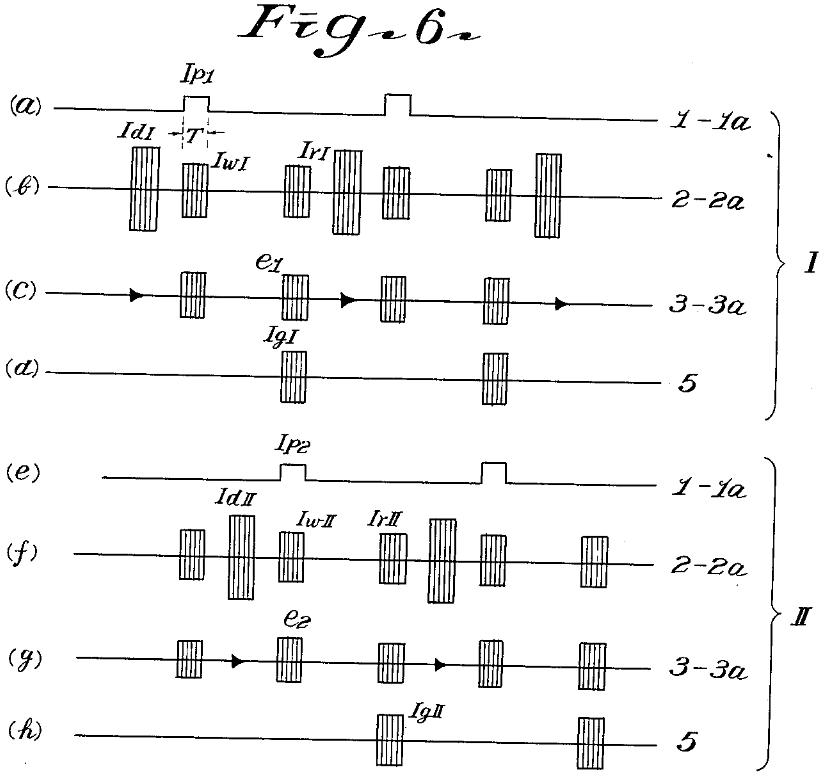
FIG. 6 shows schematic views for showing the timing diagrams as to the various currents to be supplied to the memory elements of the embodimetn of FIG. 5.

An example of this invention is shown in FIG. 5, wherein the circuit comprises memory elements $M_{11}$, $M_{21}$ and $M_{12}$ such as shown in FIG. 1. In the circuit of FIG. 5, a setting current $I_d$, writing bias high frequency current $I_w$, and a high frequency current $I_r$ for reading-out are supplied to the circuit in the form of two phases I and II as shown in FIG. 6. Furthermore, each of the memory elements $M_{21}$, $M_{12}$ . . . except the first element $M_{11}$ comprises, additionally, a feed-back winding $N_4$ as the negative feed-back means besides the input signal winding $N_1$, exciting winding $N_2$, and output winding $N_3$, said feed-back winding $N_4$ consisting of coils which are wound, respectively, on the magnetic cores $M_1$ and $M_2$ in the reverse polarity to that of the windings $N_3$ and $N_1$ and are connected in series, and said winding $N_4$ being connected to the output winding of the front stage. A selective amplifier $A_1$ and a synchronous detector $D_1$ are connected in cascade between the first and second stages, and a selective amplifier $A_2$ and a synchronous detector $D_2$ are connected in cascade between the second and third stages, and so on, in the following stages.

In the circuit of FIG. 5, when a high frequency current $I_{w1}$ for writing is supplied, as shown in FIG. 6(*b*), to the terminals 2 and 2*a* of the exciting winding $N_2$ after a setting current $I_{d1}$ has been supplied to the said winding, and an analogue information signal pulse $I_{p1}$ such as, for instance, signal of specified analogue value is supplied, at the same time as the above-mentioned currents $I_{w1}$ and $I_{d1}$, as shown in FIG. 6(*a*), to the terminals 1 and 1*a* of the signal input winding $N_1$ of the core $M_1$ and $M_2$ in the first stage, the signal corresponding to the polarity of and being in proportion to the magnitude of the current $I_{p1}$ is written in the magnetic cores $M_1$ and $M_2$ of the memory element $M_{11}$ in the form of residual magnetism as described already in connection with FIG. 1. Next, when a high frequency current $I_{r1}$ (having a frequency such as, for instance, 500 kc.) for reading-out is supplied to the terminals *a* 2*a* of the winding $N_2$ of the memory element $M_{11}$, an even order higher harmonic frequency voltage $e_1$ having an amplitude which is in proportion to the current $I_{p1}$ corresponding to the memorized contents of the memory element $M_{11}$ and having a phase corresponding to the polarity of the current $I_{p1}$ is read out as the output voltage. Accordingly, when the said output voltage $e_1$ is supplied to the input terminals 6 of the memory circuit of next stage, only the second high harmonic voltage $e_{2f}$ of the said input voltage is selectively amplified by the amplifier $A_1$ to take out said voltage $e_{2f}$ as shown in FIG. 6(*c*), and the said taken output voltage is supplied to the synchronous detector $D_1$ while supplying, as shown in FIG. 6(*d*), a detecting high frequency current $I_{g1}$ having the same frequency (1 mc.) as that of the voltage $e_1$ to the terminal 5 of the detector $D_1$ to carry out a synchronous detection, a direct current signal, that is, a pulse current $I_{p2}$ having a magnitude which is in proportion to the amplitude of the voltage $e_{2f}$ and having a phase polarity corresponding to 0 or $\pi$ can be led out as shown in FIG. 6(*e*). This output current $I_{p2}$ is supplied to the input terminals 1 and 1*a* of the input winding $N_1$ of the memory element $M_{21}$.

The writing into the element $M_{21}$ is carried out as in the case of the memory element $M_{11}$ by supplying simultaneously the said current $I_{p2}$ and a high frequency bias current $I_{w2}$ for writing, respectively, to the windings $N_1$ and $N_2$ of the memory element $M_{21}$, as shown in FIGS. 6(*c*) and 6(*f*), whereby a signal having a polarity corresponding to the polarity of the current $I_{p2}$ and having a magnitude which is in proportion to that of the said current $I_{p2}$ is written in. In this case, of course, the magnetic cores of the memory element $M_{21}$ are erased by supplying the setting current $I_{d2}$ prior to said writing.

Consequently, it will be understood that reading-out of the signal memorized in the memory element $M_{11}$ of the first stage and writing-in of the signal into the memory element $M_{21}$ of the second stage are simultaneously carried out. In this case, however, since the memory element $M_{21}$ is provided with a feed-back winding $N_4$ wound so as to be reverse, in phase, to that of the reading-out winding $N_3$ of the memory element $M_{11}$, an electric voltage $e_2$ is induced in the windings $N_3$ and $N_4$ of the memory element $M_{21}$ in the writing of the signal into the said element. In this case, although electric voltage is induced in the winding $N_3$ of the memory element $M_{21}$, writing into the memory element $M_{12}$ cannot be carried out because of the cutting off state of the current $I_{g2}$. Accordingly the electric currents derived from the memory element $M_{11}$ flows through the following loop circuit: $A_1$—$D_1$—$N_1$ of the memory element $M_{21}$ cores of the memory element $M_{21}$—$N_3$ of the memory element $M_{11}$.

Now, we will consider the amplification operation during a period of time T wherein reading-out from the memory element $M_{11}$ and writing in into the memory element $M_{21}$ are carried out by the currents $I_{g1}$, $I_{p2}$ and $I_{w2}$. Then, since the electric voltage $e_2(t)$ induced in the winding $N_4$ of the memory element $M_{21}$ is fedback in the reverse phase to that of the writing electric voltage $e_1(t)$, the difference voltage $e_i(t)$ supplied to the amplifier $A_1$ is represented by the following equation $$e_i(t)=e_1(t)-e_2(t) \qquad (1)$$

In this case, the said voltage $e_i(t)$ is led out through the amplifier $A_1$ and detector $D_1$ as the input direct current $I_{p2}$ of the memory element $M_{21}$. If it is assumed that amplification gain of the amplifier $A_1$ and detecting loss of the detector $D_1$ are represented, respectively, by G and K, the current $I_{p2}$ will be represented by the following Equation 2

$$I_{p2}(t)=G\cdot K.ei(t) \qquad (2)$$

Writing in into the memory $M_{21}$ is carried out by the input pulse current $I_{p2}$ supplied to the winding $N_1$ of the memory element $M_{21}$ and the current $I_{w2}$ supplied to the winding $N_2$. In this case, the electric voltage $e_2(t)$ is induced in the winding $N_4$ of said element. Accordingly, if it is assumed that the writing coefficient, that is, non-linear amplification gain of the analogue memory element $M_{21}$, is represented by N, the voltage $e_2(t)$ is represented by the following Equation 3

$$e_2(t)=N\cdot I_{p2}(t) \qquad (3)$$

When the ratio voltage $e_1(t)$ to $e_1(t)$ is calculated by substituting the Equations 2 and 3 into the Equation 1, the following relation is obtained $$\frac{e_2(t)}{e_1(t)}=\frac{G\cdot K\cdot N}{1+G\cdot K\cdot N} \qquad (4)$$

However, since the non-linear amplification gain N can be enlarged by increasing the number of turns of the windings $N_1$ and $N_4$, it is easy to satisfy the condition $$G\cdot K\cdot N>>1$$

by increasing the number of turns of the input winding $N_1$ of the memory element $M_{21}$ without enlarging the product $(G\cdot K)$. Accordingly, when the condition $(G\cdot K\cdot N>>1)$ is satisfied by increasing the number of turns N, the following Equation 5 will be obtained from the Equation 4.

$$\frac{e_2(t)}{e_1(t)}\doteqdot 1 \qquad (5)$$

That is, it is possible to make the electric voltage $e_2(t)$ induced in the winding $N_4$ during the writing in, the voltage $e_1(+)$ read out of the memory element $M_1$, into the memory element $M_{21}$ equal to the electric voltage $e_1(t)$.

The error, that is, difference between the voltages $e_1(t)$ and $e_2(t)$ is represented by the following equation.

$$E=\frac{e_1(t)-e_2(t)}{e_1(t)}\times 100\%$$
$$=\frac{1}{1+G\cdot K\cdot N}\times 100\% \qquad (6)$$

As described already, since the product $G\cdot K\cdot N$ with a value of about 1000 can be obtained by increasing N, it is possible to obtain the following condition with an error of 0.1% even when $G\cdot K\cdot N=1000$. In this case, the stability is little affected by the gain characteristic of the loop containing the detector and by the memory characteristic of the memory elements in the condition as described already. Accordingly, the writing, the quantity of which is proportional to the magnitude of the input information signal, can be easily carried out by only enlarging the loop gain of the circuit containing the memory elements.

The above description relates to the case wherein the memory element $M_{11}$ is read out and the output of the said reading-out is written in the memory element $M_{21}$. When the signal written in the said element $M_{21}$ is to be read out, it is only necessary to supply a high frequency current $I_{r2}$ which is equal to the writing bias current $I_{w2}$ to the winding $N_2$ of the memory element $M_{21}$, as described in connection with FIG. 1. In this case, an electric voltage which is almost equal to the voltage $e_2(t)$ is read out from the output winding $N_3$. This output can be written in into the memory element $M_{12}$ of the next stage in the same manner as the front stage. By repeating the above-mentioned operation, it is possible to shift successively the analogue amount of the signal which has been initially written.

Figure 7:
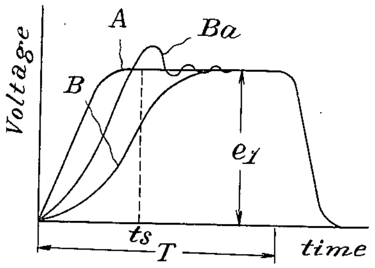
FIG. 7 shows experimental characteristic curves for showing the relation between the voltage induced and time.

FIG. 7 shows the characteristic curves for showing an example of the experimental result, said experiment having been carried out in order to ascertain the above-mentioned principle. The said curves relate to the case wherein in the circuit of FIG. 5, electric voltages induced at a connection point $a$ (output side of the detector $D_1$) and a connection point $b$ (output side of the detector $D_2$) are simultaneously observed, said voltages being taken out as the direct current pulse voltages. The curve A relates to the wave form of the voltage obtained by converting the signal read out at the point of the memory element $M_{11}$ into the direct current pulse signal in order to write in into the memory element of the next stage $M_{21}$. As will be understood, the curve A increases suddenly at the same time as the reading-out of the memory element $M_{11}$ and reaches a steady state. When the width of the writing high frequency current $I_{w2}$ flowing through the winding $N_2$ of the memory element $M_{21}$ is selected so as to be sufficiently longer than the time $t_s$, shown in FIG. 7, the memory element $M_{21}$ is written by the signal which is in proportion to the stationary voltage $e_1$. In this writing case, a feed-back voltage $e_2(t)$ is taken out of the winding $N_4$ of the memory element $M_{21}$. On the other hand, a voltage having a phase reverse to that of the said voltage $e_2(t)$ and corresponding to a voltage for reading-out is taken out of the winding $N_3$ of the said memory element $M_{21}$. Accordingly, if the currents $I_{g1}$ and $I_{g2}$ are simultaneously applied (but when shifting is to be carried out in practice, said currents $I_{g1}$ and $I_{g2}$ are alternately supplied), the voltage taken out of the winding $N_3$ of the memory element $M_{21}$ is synchronously detected by the detector $D_2$ after its selective amplification by the amplifier $A_2$, whereby a direct current pulse signal is taken out. Accordingly, when the voltage at the point $b$, that is, at the output side of the detector $D_2$ is observed, increasing of the said voltage is, as shown in the curve B, somewhat slower than in the case of the curve A, but the said voltage approaches the voltage equal to the steady value of the curve A. This fact means that, in the practical shifting, the magnitude of the shifting signal to be written in into the memory element $M_{21}$ is equal to the shifting signal to be written since levels of the curves A and B are equal or become equal to the voltage $e_1$ as shown in FIG. 7, shifted by the same amount.

It was observed that when the resultant gain of the loop is sufficiently large, the voltage approaches the steady state while carrying out a damping oscillation, as shown by the curve B$a$.

Figure 8:
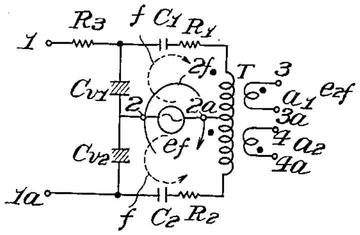
FIG. 8 is a connection diagram of another analogue memory element to be used in this invention.

The above-mentioned system can be embodied by using ferro-electric bodies in the place of ferro-magnetic bodies, as shown in the embodiment of FIG. 8. The memory circuit element of FIG. 8 consists of two ferro-electric bodies $C_{v1}$ and $C_{v2}$ which are connected in series, coupling capacitors $C_1$, $C_2$, coupling resistors $R_1$, $R_2$, and output transformer T, exciting input terminals 2 and 2$a$ connected, respectively, to a point between the ferro-electric bodies and to the center tap of the primary winding of the said transformer T, input terminal 1 and 1$a$, an exciting voltage source $e_f$ connected between the terminals 2 and 2$a$, a coupling impedance $R_3$ connected in series to the input terminal 1, one output winding having output terminals 3 and 3$a$ and coupled with one side of the said primary winding, and another output winding having output terminals 4 and 4$a$ and coupled with the other side of the said primary winding, said another output winding being used as the negative feed-back means. When the memory element such as shown in FIG. 8 is used as the elements $M_{11}$, $M_{21}$, $M_{12}$ . . . in FIG. 5, the same operation as that of the embodiment of FIG. 5 can be achieved. In this case, however, voltages corresponding to the currents $I_d$, $I_w$ and $I_r$ such as shown in FIG. 6 are to be used as the exciting power.

The above description related to the case, wherein an even order higher frequency current generated during the writing process of the self stage and reading-out process of the front stage is fed back as it is, only the second harmonic component contained in the difference voltage, that is, difference voltage between the said fed back voltage and the even order higher harmonic voltage obtained by reading out the front stage is detected after having been selectively amplified by an amplifier, and this detected signal is written in into the self stage as the information signal. However, in the following, we will describe in connection with the case wherein all of the even order higher harmonic voltage produced during writing and reading processes is not directly fed back, but selectively fed back after a particular even order harmonic has been selected.

Figure 9:
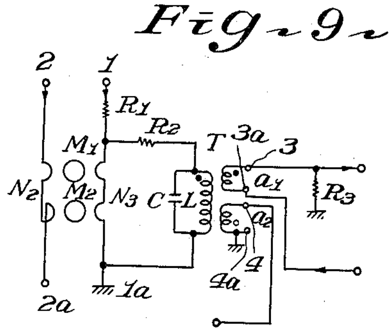

In FIG. 9 is shown an improvement of the analogue memory element of FIG. 1. In the circuit of FIG. 9, the output winding $N_3$ is used as the winding $N_1$ and is connected, through a coupling impedance $R_2$, parallel to a tuning circuit consisting of a capacitor C and an inductance coil forming the primary winding of the output transformer T to select the second harmonic of the generated even order harmonic voltage, and the secondary side of the said transformer consists of two identical windings, one of which being used as the output means having output terminals 3 and *3a*, and the other being used as the negative feed back means having output terminals 4 and *4a*, whereby only the second high harmonic among the even order harmonics generated during the writing and reading processes is selected.

Figure 10:
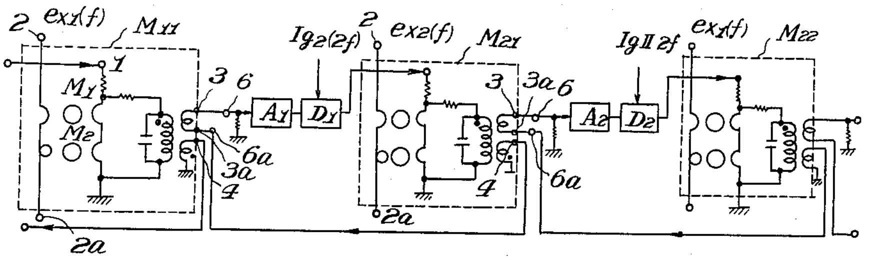
FIGS. 10 and 11 are, respectively, connection diagrams of the other embodiments of this invention.

Accordingly, when the elements such as shown in FIG. 9 are used in cascade connection thereof through $A_1$ and $D_1$ as shown in FIG. 10, only the second harmonic can be selected and fed back to write it in the same manner as that of the embodiment of FIG. 5. When in the memory element of FIG. 8, the capacitances of the capacitors $C_{v1}$, $C_{v2}$, $C_1$ and $C_2$ and inductance of the primary winding of the transformer T are selected so as to make the closed circuit consisting of the said members resonate with the second high harmonic of the generated voltage, and with this element are substituted the memory elements of the embodiment of FIG. 10, the same operation as that of the embodiment of FIG. 10 can be obtained.

Figure 11:
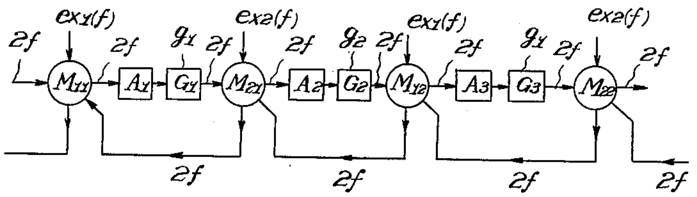

FIGS. 5 and 10 relate to the circuits wherein the second high harmonic of the error signal is amplified and detected to produce a direct current signal, and this signal is supplied to the input winding to carry out writing. On the other hand, as described in FIG. 3, it is possible to write any analogue information by making the ratio of the frequencies of the exciting current and information input signal current 1:2. Accordingly, in the circuit of FIG. 11 wherein the detector D is subtituted by a gating circuit G, if the difference (error signal) between the signal read out of the front stage and the fed back signal is amplified and gated, the second high harmonic can be directly supplied to the input winding to carry out the same writing as in the above cases.

FIG. 12 shows the embodiment wherein four magnetic cores $M_1$–$M_4$ are used, each of the said cores having four coils. In one core $M_1$, all the coils are wound in the same polarity; and each of the other three cores $M_2$, $M_3$ and $M_4$ has two coils having the same polarity and two other coils having the reverse polarity. The output winding $N_3$ is formed by connecting in series four coils which are wound, respectively, on the cores $M_1$, $M_2$, $M_3$ and $M_4$ in the same polarity. In connection with the other coils, each of the input signal winding $N_1$, 1st exciting winding $N_2$ and 2nd exciting winding $N_{2a}$ are, respectively, formed by connecting in series two coils having the same polarity and two other coils having the reverse polarity, said 1st and 2nd exciting windings being, respectively, excited by a current having frequency $f_1$ and a current having frequency $f_2$. The output winding $N_3$ is connected, through the coupling resistance $R_2$, to a tuning circuit consisting of a capacitor C and an inductance coil forming the primary winding of the output transformer T, said tuning circuit being made to resonate with only the frequency $(f_1+f_2)$ or $(f_1-f_2)$ among the modulation product $(f_1 \pm f_2)$. The secondary winding consists of two identical windings, one of which being used as the output means having output terminals, and the other being used as the negative feed back means having output terminals 4 and *4a*, whereby only the voltage having the frequency $(f_1+f_2)$ or $(f_1-f_2)$ among the modulation product produced in the writing and reading process is memorized in the memory element.

By substituting the memory elements $M_{11}$, $M_{21}$, $M_{22}$ in FIG. 10 by the memory element of FIG. 12, the same operation as in the case of FIG. 10 can be obtained.

The above description relates to the case wherein the signal equal to the voltage read out of the front stage by feeding back the total voltage taken out of the feed back terminals is written in self stage. However, when as shown in FIG. 13, a variable attenuator $\alpha$ is inserted between the output terminals 3 of the front stage and the input terminals 6 of self stage, and the feed back terminals 4 of self stage are directly connected to the input terminals 6, or feed back terminals 4 are connected to the variable attenuator $\beta$ to feed back a part of the voltage generated in the writing process so as to compare said part of the voltage with a part of the output of the front stage, the amount corresponding to the product of the voltage read out of the front stage and a certain standard voltage can be written into the self stage. Of course, it is possible to insert both the attenuators $\alpha$ and $\beta$.

The above description relates to the embodiments utilizing the memorizing effect of the memory element which is nonlinear elements and its voltage-amplification. However, non-linear amplifying character of the said memory element is not always necessary as long as the said element has the memorizing character. In this case, the same operation can be made possible by inserting a means having amplifying character into the feed back loop.

According to this invention, as described above, a pulse signal or a high frequency signal representing any analogue amount is supplied to the memory element as the information signal, and a feed back loop is used in combination with the said memory element, so that the analogue amount can be stably and precisely memorized without being affected by the gain characteristic of the said loop, whereby a very effective memory circuit is obtained.

Accordingly, when the circuit of this invention is utilized, construction of various analogue arithmetic computing circuits such as analogue simulator or any desired frequency characteristic circuit which are used in the automatic control or communication technique vision can be made easily possible.

What we claim is:

1. An analogue memory circuit comprising memory means provided with an even number of memory elements made of a ferro-electric material for memorizing an input signal according to the residual state of the memory elements, input terminal means for applying an input signal to the memory means, exciting means for applying to the memory means simultaneously with the application of the input signal, a high frequency alternating bias signal having a suitable intensity for inducing a field the strength of which is at least equal to the magnitude of the coercive force of the memory elements respectively and for applying to said memory means a high frequency alternating reading out signal having a frequency equal to that of the high frequency bias signal and having a suitable intensity for performing non-destructive sensing of the residual state of said elements after the simultaneous applications of the input signal and the high frequency alternating bias signal, output terminal means for deriving from said memory means an output signal which has a frequency equal to twice the frequency of the reading out signal and induced by the application of said high frequency reading-out signal, and feed back terminal means for deriving from the memory means, a negative feed back signal induced therein by the simultaneous application of the input signal and the high frequency bias signal, a feed back loop means for feeding back the feed back signal from the feed back terminal means to the input terminal means, gating means for gating the feed back signal during the duration of the input signal only, said gating means being connected in the feed back loop means, an input signal applying means coupled to said feed back loop for applying a high frequency analogue signal thereto having a frequency equal to twice the frequency of the reading out signal and an intensity proportional to that of an analogue input information signal to be memorized and a phase corresponding to one of two phases having a phase difference of $\pi$ from each other in accordance with the plus or minus polarity of the analogue information signal to be memorized, whereby writing in said memory means is performed by employing as the input signal to the memory means, a difference voltage signal between the voltage of the high frequency analogue information signal and the negative feed back signal.

2. An analogue memory circuit according to claim 1, in which the memory elements comprise two ferrodielectrics connected in series, a ring connection comprising the series connected two ferrodielectrics, a transformer comprising a primary winding and two series connections comprising respectively a capacitor and a resistor, the ring connection comprising terminals of the series connected two ferrodielectrics and terminals of the primary winding connected in parallel through the respective one of the two series connections, a coupling resistance, terminals on the input means connected to the terminals of the series connected two dielectrics through said coupling resistance, terminals on said exciting means connected at the connection point of the two dielectrics and a midpoint of the primary winding, and the output means and the feed back means respectively comprising identical secondary windings of said transformer.

3. An analogue memory circuit comprising memory means provided with an even number of memory elements made of a ferromagnetic material for memorizing an input signal according to the residual state of the memory elements, input terminal means for applying an input signal to the memory means, exciting means for applying to the memory means simultaneously with the application of the input signal, a high frequency alternating bias signal having a suitable intensity for inducing a field the strength of which is at least equal to the magnitude of the coercive force of the memory elements respectively and for applying to said memory means a high frequency alternating reading out signal having a frequency equal to that of the high frequency bias signal and having a suitable intensity for performing non-destructive sensing of the residual state of said elements after the simultaneous applications of the input signal and the high frequency alternating bias signal, output terminal means for deriving from said memory means an output signal which has a frequency equal to twice the frequency of the reading out signal and induced by the application of said high frequency reading-out signal, and feed back terminal means for deriving from the memory means, a negative feed back signal induced therein by the simultaneous application of the input signal and the high frequency bias signal, a feed back loop means for feeding back the feed back signal from the feed back terminal means to the input terminal means, gating means for gating the feed back signal during the duration of the input signal only, said gating means being connected in the feed back loop means, an input signal applying means coupled to said feed back loop for applying a high frequency analogue signal thereto having a frequency equal to twice the frequency of the reading out signal and an intensity proportional to that of an analogue input information signal to be memorized and a phase corresponding to one of two phases having a phase difference of $\pi$ from each other in accordance with the plus or minus polarity of the analogue information signal to be memorized, whereby writing in said memory means is performed by employing as the input signal to the memory means, a difference voltage signal between the voltage of the high frequency analogue information signal and the negative feed back signal.

4. An analogue memory circuit according to claim 3 including detecting means provided for performing synchronous detection by utilizing a synchronous reference signal, said detecting means having terminal means for receiving a synchronous reference signal, said terminal means being connected to said feed back loop means in order to detect the difference voltage signal, and wherein the frequency of the high frequency bias signal and that of the reading-out signal are respectively selected to be one half of and to be equal to that of the output signal, whereby an analogue signal of direct current which has an intensity and a polarity identical, respectively, to those of the analogue input information signal to be memorized is applied to the input means of the memory circuit elements as the input signal thereof.

5. An analogue memory circuit according to claim 3 further including an amplifying means connected in said feed back loop means to amplify selectively the difference voltage signal and having a characteristic capable of amplifying selectively a frequency component equal to twice the frequency of the high frequency bias signal.

6. An analogue memory circuit according to claim 3, further including variable attenuator means connected between the feed back means and the input signal applying means for controlling the magnitude of the feed back signal.

7. An analogue memory circuit according to claim 3, in which said memory elements comprise two magnetic cores having substantially identical rectangular hysteresis characteristics, one of said two cores being provided with four coils wound thereon in the same winding direction with the exception of one coil and the other of said two cores being provided with four coils wound thereon so that two coils have a reverse winding direction to those of the remaining two coils, an input winding comprising said input means composed of two coils wound respectively on the two cores in the same winding direction and connected in series, an output winding comprising said output means composed of two coils wound respectively on the two cores in the same winding direction and connected in series, an exciting winding comprising said exciting means composed of two coils wound respectively on the two cores so that one coil has the same winding direction as those of coils of the input winding and the outer winding wound on the same core and the other coil has the winding dierction reverse to those coils of the input winding and the output winding wound on the same core and connected in series, and said exciting means comprising a feed back winding composed of two coils wound respectively on the two cores in reverse polarity to the coils of the input winding and the output winding and connected in series.

8. An analogue memory circuit according to claim 3, in which the memory elements comprise two magnetic cores having substantially identical rectangular hysteresis characteristics, one of the two cores being provided with two coils wound thereon in the same winding direction and the other of the two cores with two coils wound thereon in the reverse winding direction to each other, a coupling resistance, an input winding comprising two coils wound respectively on the two cores and connected in series and connected to the input means through said coupling resistance, an exciting winding comprising said exciting means and composed of the remaining two coils connected in series, a coupling resistance and a tuning circuit connected with the output winding in parallel through said coupling resistance, said tuning circuit comprising a parallel connection comprising a transformer primary winding and a capacitor, said output means and said feed back means respectively comprising identical secondary windings of said transformer.

9. An analogue memory circuit according to claim 3, in which the memory elements comprise four magnetic cores having substantially rectangular hysteresis characteristics, one of the cores being provided with four coils.

References Cited by the Examiner

UNITED STATES PATENTS

| | | | |
|---|---|---|---|
| 2,948,819 | 8/1960 | Goto | 307—88 |
| 2,968,028 | 1/1961 | Goto | 307—88 |

FOREIGN PATENTS

| | | |
|---|---|---|
| 778,883 | 7/1957 | Great Britain. |
| 841,571 | 7/1960 | Great Britain. |

IRVING L. SRAGOW, *Primary Examiner.*

R. R. HUBBARD, H. D. VOLK, *Assistant Examiners.*